July 9, 1968 — E. M. BECKER ET AL — 3,391,570

BATTERY-OPERATED PUMPING UNIT FOR GAS ANALYSIS

Filed April 2, 1965 — 2 Sheets-Sheet 1

INVENTORS.
EARL M. BECKER
JAMES H. BEPLER
BY Brown, Critchlow, Flick & Peckham.
ATTORNEYS.

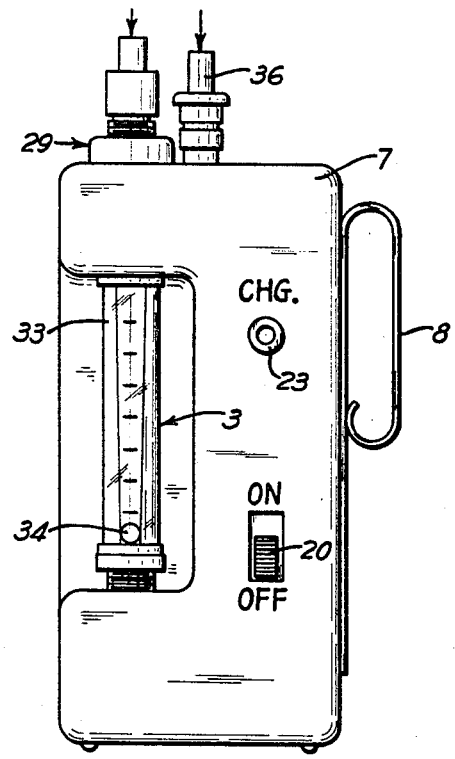
Fig. 4
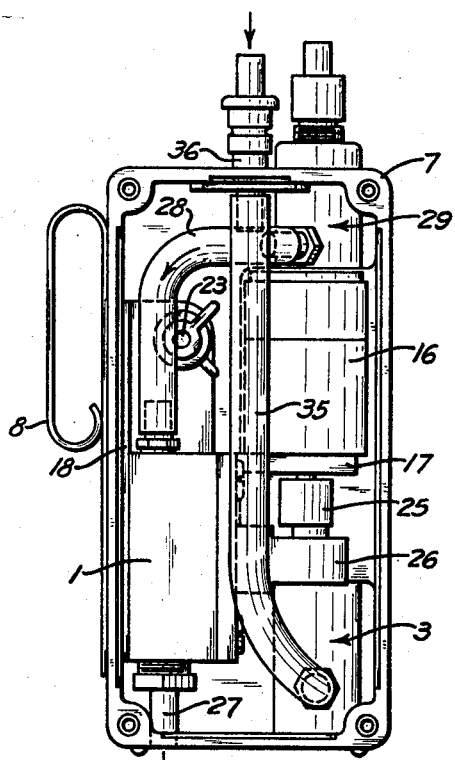
Fig. 5
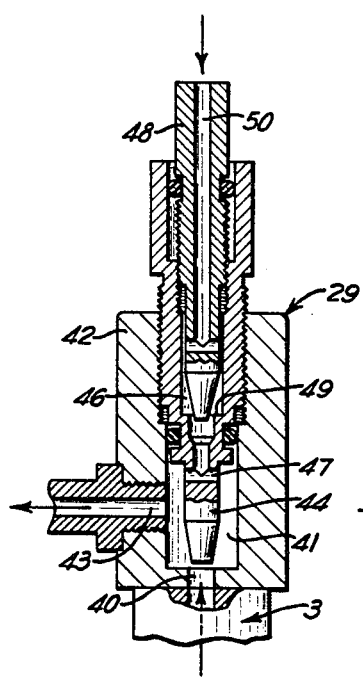
Fig. 7
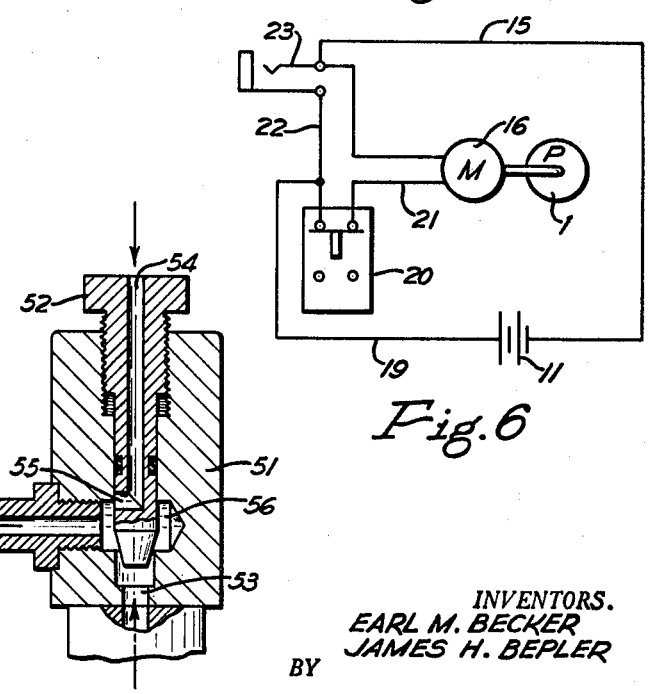
Fig. 6
Fig. 8
INVENTORS.
EARL M. BECKER
JAMES H. BEPLER

United States Patent Office 3,391,570
Patented July 9, 1968

3,391,570
BATTERY-OPERATED PUMPING UNIT
FOR GAS ANALYSIS
Earl M. Becker and James H. Bepler, Pittsburgh, Pa., assignors to Mine Safety Appliances Company, Pittsburgh, Pa., a corporation of Pennsylvania
Filed Apr. 2, 1965, Ser. No. 444,953
8 Claims. (Cl. 73—23)

ABSTRACT OF THE DISCLOSURE

A flowmeter has an inlet for connection to the outlet of a gas analyzing device, and an outlet connected with the inlet of a throttling valve. The outlet of the valve is connected with the inlet of a battery-operated pump provided with an exhaust port. Adjustable means admits air to the gas sample between the valve and pump.

---

It is common practice to use a suction pump for drawing a gas sample through an analyzing device. A flowmeter often is connected into the line between the analyzer and the pump, and the line may also contain a valve for regulating the sample flow. In portable apparatus where the pump must be operated by a battery, the drain on the battery becomes very important because it determines how long the apparatus can be used before the battery has to be recharged or replaced. When the sample flow is restricted materially, which is inherent in some applications, the restricted flow to the pump causes it to work harder and thereby draw more battery current and quickly run down the battery.

It is among the objects of this invention to provide a battery operated pumping unit for gas analysis, in which the pump can operate at its greatest efficiency for a particular test set-up, in which the battery can operate over a long period of time without replacement or recharging, in which very small sample flow rates can be obtained, which is simple and compact in construction, and which includes a valve of novel construction.

In accordance with this invention, the inlet of a flowmeter is adapted to be connected to the outlet of a gas analyzing device through which a gas sample can flow. A valve has a sample inlet connected with the flowmeter outlet. The valve inlet is controlled by an adjustable throttling member. Connected with the valve outlet is a battery-operated pump that has an exhaust port. At the downsream side of the valve throttling member there is adjustable means for admitting atmospheric air to the gas sample before it reaches the pump so that there always can be maximum flow through the pump for greater efficiency of pump operation and consequently lower drain on the battery operating the pump. The flowmeter, valve, pump and battery may all be mounted in a single compact case that can be carried on the belt or in some other manner. Preferably, the battery is rechargeable.

Figure 2:
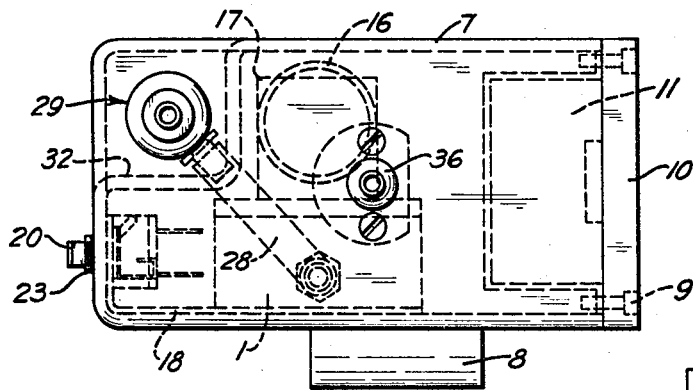
Figure 1:
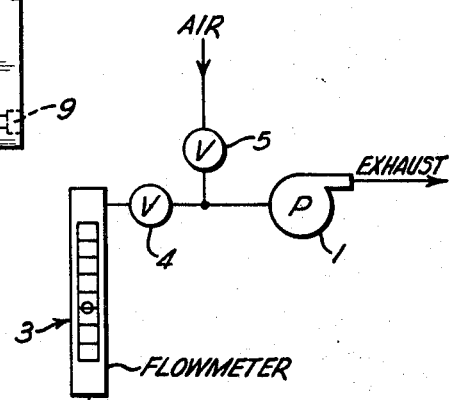
Figure 3:
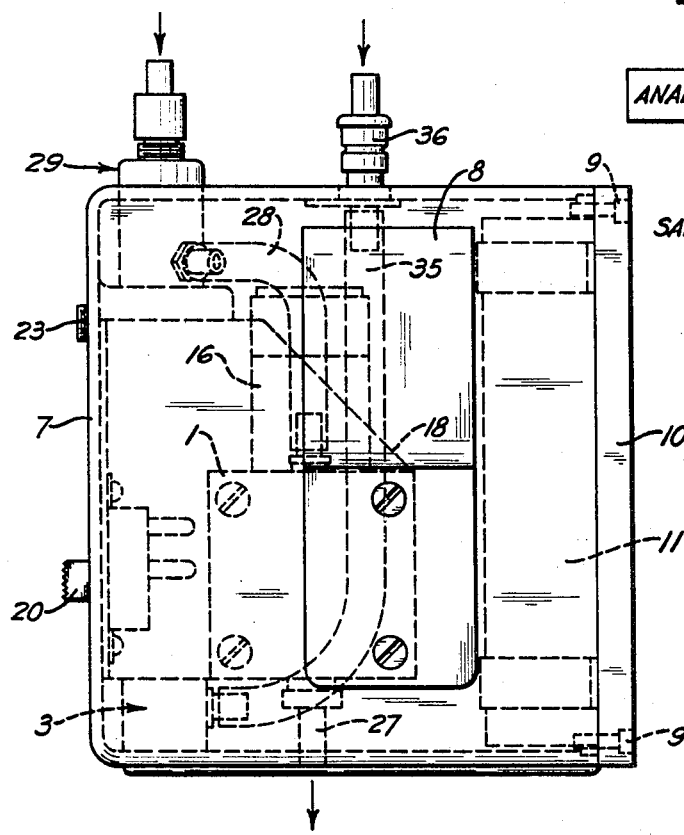

The preferred embodiment of the invention is illustrated in the accompanying drawings, in which FIG. 1 is a diagram of the gas flow circuit;
FIG. 2 is a plan view of the pumping unit;
FIG. 3 is a side view thereof;
FIG. 4 is a front view;
FIG. 5 is a rear view of the unit, with the back cover removed;
FIG. 6 is a wiring diagram;
FIG. 7 is an enlarged vertical section of the valves; and
FIG. 8 is a view, similar to FIG. 7, of a modified valve.

Referring to FIG. 1 of the drawings, the diagram illustrates the manner in which the various elements of this pumping unit are connected together and to a gas analyzing device. The pump 1 draws a gas sample through a suitable analyzer 2 and when through a flowmeter 3 that shows the sample flow rate. The flow rate is controlled by a throttling valve 4 in the line between the flowmeter and the pump. Adjustable means 5 is provided for admitting atmospheric air to the gas sample after it has reached the throttling valve and before it reaches the pump. This bypass air permits a full flow of gas (mixture of sample and air) into the inlet of the pump at all times and thereby allows the pump to operate continuously with minimum drain on the battery that operates the pump.

This invention is not concerned with the analyzing device 2, but only with the pumping unit, which includes the flowmeter, the sample and air admission valve means, the pump, and the motor and battery for operating the pump. All of these elements are mounted in a small rectangular case 7 that may be provided on its side with a hook 8 for supporting the case on a man's belt. One end wall of the case is attached to the rest of the case by corner screws 9 to form a removable cover 10. Mounted on the inside of this cover is a battery 11, which most suitably is the rechargeable type.

Referring to the wiring diagram in FIG. 6, the battery is connected by a wire 15 to one side of a pump motor 16 mounted on a bracket 17 (FIG. 5) attached to one side of the diaphragm pump 1, which is carried by another bracket 18 attached to the inside of the case. The other side of the battery is connected by a wire 19 to an electric switch 20 that is connected by a wire 21 to the other side of the motor. The switch is mounted inside the case and is operable from outside of the end opposite to the removable cover (FIG. 4). The side of the switch that is connected to the battery is also connected by a wire 22 to an electric jack 23 mounted in the fixed end wall of the case above the switch. This jack also is electrically connected to wire 15 from the other side of the battery. When the switch is closed, as shown in FIG. 6, the motor will be operated by the battery through wires 15, 19, and 21. A plug from an electric charger (not shown) can be plugged into the jack to recharge the battery through wires 15, 22, and 19 when the switch is off, but if the switch is closed when this pumping unit is not being used as a portable unit but as a bench unit, it can be operated by the battery and recharger simultaneously because both will be connected with the pump motor. While the unit is being used in this manner, the battery recharger will be supplying most of the electric power for operating the pump.

The pump motor, through an eccentric 25, shown in FIG. 5, operates a crank arm 26 that reciprocates the diaphragm of the pump. The exhaust port of the pump is fitted with a nipple 27 aligned with an opening in the bottom of the case. The inlet of the pump is connected by a tube 28 to the outlet of a valve 29, the inlet of which is connected to the outlet of the flowmeter 3. To support the flowmeter in a position where it is visible from the outside of the case, one corner of the case can be off-set inwardly to form an external recess 32, as shown in FIG. 4, in which the vertical flowmeter tube 33 can be housed. The lower end of the tube is mounted in an adjustable retainer supported by the bottom wall of the recess, and the upper end of the tube is mounted in the top wall. The tube is calibrated and contains a float 34 that is carried upwardly in the tube when gas flows upwardly through it. The height of the float in the tube indicates the sample flow rate. As just indicated, the inlet of the flowmeter tube is at its lower end, and this inlet is connected by a tube 35 inside the case with a nipple 36 rigidly mounted in the top of the case. The upper end of this nipple is adapted to be connected by a suitable hose to the gas analyzing device 2, through which a sample is to be drawn by the pump.

The valve 29 is rigidly mounted in the top of the case and its sample inlet, which is at its bottom, is connected directly to the upper end of the flowmeter tube. As shown in FIG. 7, the valve inlet 40 opens into the bottom of a valve chamber 41 in the valve body 42, one side of which is provided with the valve outlet 43 that is connected by tube 28 to the pump inlet. To control the sample flow, the size of the valve inlet is controlled by an adjustable throttling member operable from above the case. Preferably, this throttling member is a vertical stem 44 that is threaded in a bore in the valve body in line with the valve inlet. The stem extends down through the valve chamber to a seat at the upper end of the inlet. It will be seen that by turning the valve stem it can be raised and lowered to vary the size of the valve inlet and thereby the flow rate of the sample through the valve and thus through the flowmeter, and analyzing device. As the valve is adjusted in this manner, the sample flow rate can be observed in the flowmeter.

With the valve inlet 40 restricted by the throttling member and only the sample being delivered to the pump, the pump would have to work hard and that would draw considerable battery current and run down the battery in a short time. It is a feature of this invention that such a situation can be avoided by providing for operating the pump at full volumetric capacity at all times, regardless of the size of the sample gas flow. Accordingly, a variable quantity of air is admitted to the system between the downstream side of throttling member 44 and the pump inlet. Such an air bypass 5 into the sample stream can be used to compensate for any sample flow restriction, so a mixture of gas and air at full stream can be fed to the pump continuously. Preferably, the bypass is combined with valve 29. This can be done by providing valve stem 44 with an axial inlet passage 46 extending downward from its upper end and connected with the valve chamber by radial openings 47 above the tapered lower end of the stem. To control this passage, a second hollow stem 48 is threaded in the other stem and has a tapered lower end cooperating with a valve seat 49 in the outer stem above its radial openings 47. The inner stem has a passage 50 extending downwardly from its upper end and opening laterally into the inside of the outer stem above seat 49. It will be seen that if the inner stem is screwed down onto its seat, no atmospheric air will be admitted into the valve, but if the inner stem is moved upwardly in the outer stem, air will enter and mix with the sample in the valve chamber. The proportion of air to sample will depend upon the relative positions of the two valve stems and their seats.

In using this pumping unit, first the sample valve inlet 40 is closed by turning down stem 44, and then the air bypass valve is opened wide by retracting inner hollow stem 48. Then the sample valve is slowly opened by turning the outer stem until the desired reading on the flowmeter is obtained. The sample drawn through the analyzing device and flowmeter will be free of air, but the gas entering the pump will be a mixture of the sample and the bypass air and in considerably greater volume than the flow through the flowmeter. If the float in the flowmeter is not able to rise to the desired height with the sample valve wide open, then the bypass valve can be closed slowly until the desired float position is obtained. In either case, the pump operates at its minimum current drain setting for that particular test set-up or that particular flow restricting load. The air bypass forms a fixed orifice for a particular type of test only. When it is repositioned for a new test, it becomes another fixed orifice of a different size for that test.

Instead of using a combination sample and bypass valve having two independently movable valve stems 44 and 48, a valve 51 with a single stem 52 screwed into it can be used, as shown in FIG. 8. This stem has a tapered lower end to cooperate with a seat at the bottom inlet 53 of the valve. The stem also has an axial passage 54 extending downwardly from its upper end and connected by one or more radial openings 55 at its lower end with the valve chamber 56 when the stem is in its lower position. Thus, when the sample inlet is closed, the air bypass will be wide open through the hollow stem. As the stem is turned to open the sample inlet, the rising opening 55 in the stem becomes restricted by the valve body wall around it above chamber 56, and the flow of air down into the valve is reduced. In other words, the more sample the less air; the less sample the more air. This valve is simpler in construction and operation than the one first described, but it is not subject to as fine control as that one.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A battery-operated pumping unit for gas analysis, comprising a flowmeter having an inlet and an outlet, said inlet being adapted to be connected to the outlet of a gas analyzing device through which a gas sample can flow, a valve having a gas inlet connected with said meter outlet and also having an outlet, an adjustable throttling member for said valve inlet, a battery-operated pump having an inlet connected with said valve outlet and also having an exhaust port, and adjustable means at the downstream side of said throttling member for admitting air to the gas sample before it reaches the pump.

2. A battery-operated pumping unit according to claim 1, in which said valve contains said adjustable means.

3. A battery-operated pumping unit according to claim 1, in which said flowmeter includes a flow tube for a gas sample, and said valve is mounted in the outlet of the tube.

4. A battery-operated pumping unit according to claim 1, including a case that houses all of the elements recited in said claim except the gas analyzing device, said unit also including a motor in the case for driving the pump, a rechargeable batter disposed in the case for operating said motor, and connecting means carried by the case for detachably connecting a battery charger with the battery.

5. A battery-operated pumping unit according to claim 4, including an electric switch carried by said case and operable when closed to connect said connecting means and the battery with said motor, whereby the pump can be operated by the battery and a battery charger simultaneously when desired.

6. A battery-operated pumping unit according to claim 1, in which said throttling member and adjustable means are in the form of a stem threaded in said valve and having an inner end for throtttling the valve inlet, the stem being provided with a passage having one end open to the atmosphere and having its opposite end communicating with said valve outlet during throttling of the valve inlet.

7. A battery-operated pumping unit for gas analysis, comprising a flow meter having an inlet and an outlet, said inlet being adapted to be connected to the outlet of a gas analyzing device through which a gas sample can flow, a valve having a gas inlet connected with said meter outlet and also having an outlet, a hollow stem threaded in said valve and having a solid inner end for throttling said valve inlet, said stem being provided with an opening connecting the inside of the stem with said valve outlet, the inside of the stem having a valve seat, an inner hollow stem threaded in the other stem and having a solid inner end for engaging said seat, the inner stem being provided with an opening connecting its inside with the inside of the other stem to admit air thereto, and a battery-operated pump having an inlet connected with said valve outlet and also having an exhaust port.

8. A battery-operated pumping unit for gas analysis, comprising a case provided in one end with an external recess, a flowmeter tube mounted in said recess and having an inlet at its bottom and an outlet at its top, a conduit in the case connected with said inlet for delivering thereto a gas sample from a gas analyzing device, a valve mounted in the top of the case and having a gas inlet connected with said tube outlet and also having a lateral outlet inside the case, an adjustable throttling member for said valve inlet projecting above the case for manual operation, adjustable means in the valve at the downstream side of said throttling member and provided with an air inlet for admitting air to the gas sample before it leaves the valve, said adjusting means projecting above the case for manual operation, a pump in the case having an inlet connected with said valve outlet, the pump and case being provided with exhaust ports, an electric motor in the case for driving the pump, and a battery in the case for operating said motor, whereby a gas sample will be drawn by the pump through said flow tube and valve in succession and discharged from the pump and case.

References Cited

UNITED STATES PATENTS

| | | | |
|---|---|---|---|
| 1,360,431 | 11/1920 | Molas | 137—637.2 |
| 2,310,435 | 2/1943 | Jenkins | 73—23 |
| 2,970,822 | 2/1961 | Ernest | 137—637.2 |
| 3,308,648 | 3/1967 | Moulton et al. | 73—23 |

RICHARD C. QUEISSER, *Primary Examiner.*

C. I. McCLELLAND, *Assistant Examiner.*